Sept. 17, 1940.                H. J. MURPHY                 2,215,248
                            KNOB FASTENING DEVICE
                              Filed May 19, 1939
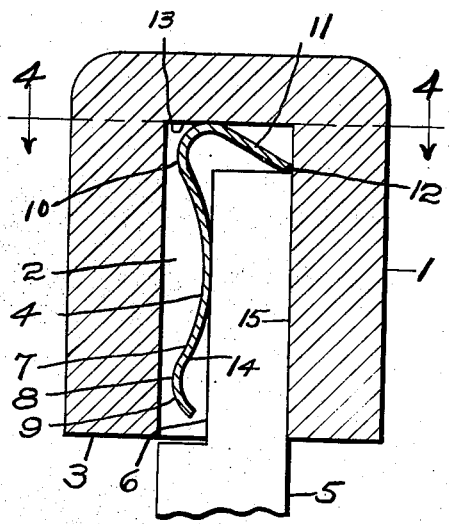
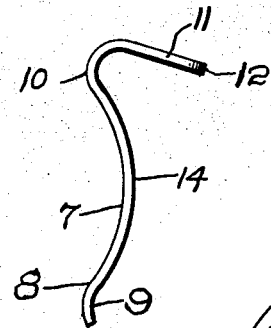
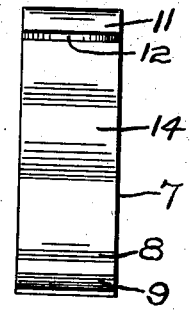
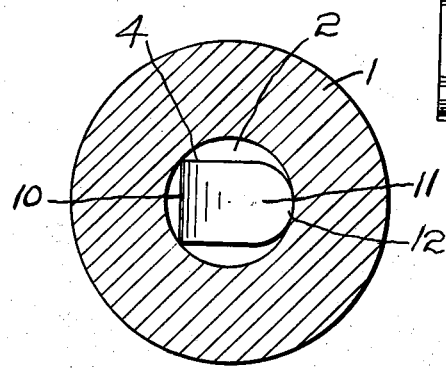
Inventor:
Howard J. Murphy.
By John Todd
        Att'y.

Patented Sept. 17, 1940

2,215,248

UNITED STATES PATENT OFFICE 2,215,248

KNOB FASTENING DEVICE

Howard J. Murphy, Greenwood, Mass., assignor to United-Carr Fastener Corporation, Cambridge, Mass., a corporation of Massachusetts Application May 19, 1939, Serial No. 274,565

3 Claims. (Cl. 287—53)

This invention relates to knobs and like fastening installations and fasteners for the same.

Referring to the drawing, in which I have illustrated a preferred form of my invention:

Fig. 1 is a longitudinal sectional view through a knob member showing a shaft secured to the knob member by means of my improved fastener member;

Fig. 2 is a side elevation of the fastener member shown in Fig. 1;

Fig. 3 is a front plan view of the fastener member shown in Fig. 2; and

Fig. 4 is a sectional view taken along the line 4—4 of Fig. 1 showing the manner in which the fastener is secured to the knob.

My invention relates to improvements in knob devices which may be of the type used on radio dial panels or automobile instrument panels and is particularly directed to an improved fastener member adapted to be quickly and easily assembled with an article of manufacture such as a control knob of the type described for the purpose of detachably securing a shaft member in non-rotative relation to the knob.

Referring to the installation shown in Figs. 1 and 4, I have provided a knob 1, which may be of plastic or other material, having a circular opening or bore 2 extending from an end face 3 into the body of the knob. My improved fastener member 4 is disposed in assembled relation with the knob within the bore 2 and provides an efficient means for detachably securing a shaft member 5 to the knob. The shaft member 5 may be of the type adapted for connecting parts of automobile and radio apparatus with finger operative knob means disposed in operating position on a dial or instrument panel. The shaft 5 has a flat face 6 adjacent its free end for cooperation with the fastener member in a manner to be described.

The fastener member 4 is preferably formed of one piece of spring metal and provides an elongated shaft-engaging bowed portion 7. Integral with an end 8 of the bowed portion 7 I have provided a lip portion 9 flared outwardly to one side of the bowed portion for a purpose to be described. Integral with an opposite end 10 of the bowed portion 7 from that to which the lip portion 9 is joined I have provided attaching means in the form of a spring tongue 11. The spring tongue 11 is bent laterally at an angle to the bowed portion 7 with the free end 12 of the tongue facing substantially toward that end of the fastener having the lip portion 9. It will be noticed that the spring tongue 11 is constructed in such a way that the normal distance between edges of the tongue at the free end 12 thereof and points on the bowed portion 7 in a horizontal plane through the free end portion 12 is greater than the distance between the chord of the bowed portion 7 with the opening 2 when the fastener is in assembled relation with the knob and the point of engagement of the free end portion 12 with the wall of the opening 2 with the result that at least one of the edges of the free end of the tongue engages a wall of the opening 2 when the spring tongue is finally seated within the opening, as shown in Fig. 1. Thus if either the knob 1 or the fastener 4 is pulled relative to the other for the purpose of separating the parts, an edge of the free end of the tongue bites into the wall of the bore and resists such separation as it tends to flatten under stress.

Assembly of the fastener member 4 with the knob member 1 is a relatively simple matter and is carried out by moving the fastener member into the opening 2 of the knob until the spring tongue 11 abuts the closed end 13 of the opening 2. When the fastener member is set in final attached position within the bore of the knob, the spring tongue 11 is compressed slightly so as to frictionally engage the wall of the bore (Fig. 1) and thereby rigidly secure the parts together. At the same time the free ends 8 and 10 of the bowed portion 7 engage the wall of the knob with the lip portion 9 extending outwardly away from the wall. When the shaft member is secured to the knob, the free end of the shaft is moved into the bore 2 between the outer surface 14 of the bowed portion 7 and the wall portion 15 of the opening 2 facing the surface 14. The distance between the surface 14 at the most outwardly-bowed portions of the portion 7 and the wall portion 15 is relatively less than the diameter of the shaft through the flat face 6. Thus passage of the shaft member between the aforesaid parts causes the bowed portion 7 to contract or flatten so as to permit the shaft to be extended into the knob. After the shaft has been moved into the knob a predetermined distance, it is held therein against the tension of the bowed portion 7 engaging the flat surface 6 to force the shaft against the wall 15. It will be seen that the function of the lip portion 9 is to effect free elongation of the bowed portion 7 when contracted by the shaft. The shaft is now securely assembled in non-rotative relation to the knob and may not be removed until sufficient relative pull pressure has been exerted on either the knob or the shaft to overcome the force exerted by the bowed portion 7 upon the flat surface 6 of the shaft.

Thus by my invention I have provided an installation of simple construction comprising a knob member and a fastener member normally rigidly assembled together, but detachable should it be desired. As a result of the particular construction of the parts of my installation, it is possible to assemble my improved fastener member with a knob member having a single circular opening therein in a way to effect a satisfactory detachable fastening device for the purposes described.

Although I have illustrated and described a preferred embodiment of my invention, I do not wish to be limited thereby because the scope of my invention is best defined by the following claims.

I claim:

1. The combination with a shaft and an article of manufacture having a bore into which one end of said shaft extends and a fastener member having an elongated bowed portion disposed within said bore and resiliently engaging a side of said shaft for securing said shaft to said article, and a resilient attaching portion integral with said bowed portion adjacent to its innermost end and extending across the inner end of the shaft into engagement with the material of said article adjacent said bore for attaching said fastener to said article.

2. The combination with a shaft and an article of manufacture having a bore of a fastener member having an elongated bowed portion disposed within said bore and abutting said bore at spaced points, said bowed portion resiliently engaging a side of said shaft when entered into said bore for securing said shaft to said article, said bowed portion having a free end portion extending outwardly away from the material of said article adjacent said bore, and a resilient attaching portion integral with an opposite end of said bowed portion from said free end portion, said attaching portion being seated within said bore and extending across the inner end of said shaft into engagement with the material of said article adjacent said bore for attaching said fastener to said article.

3. The combination with a shaft and an article of manufacture having a single circular bore only of a fastener member having an elongated bowed portion disposed within said bore and resiliently engaging a side of said shaft for securing said shaft to said article, and a resilient tongue portion integral with one end of said bowed portion, said tongue portion being seated within said bore and engaging the material of said article adjacent said bore at a side opposite to the bowed portion for attaching said fastener to said article.

HOWARD J. MURPHY.